United States Patent
Reil

(10) Patent No.: US 6,759,458 B2
(45) Date of Patent: Jul. 6, 2004

(54) THERMOPLASTIC MOLDING COMPOSITION AND ITS USE FOR LASER WELDING

(75) Inventor: Frank Reil, Gernsheim (DE)

(73) Assignee: Ticona GmbH (DE)

(*) Notice: Subject to any disclaimer, the term of this patent is extended or adjusted under 35 U.S.C. 154(b) by 15 days.

(21) Appl. No.: 09/931,330

(22) Filed: Aug. 16, 2001

(65) Prior Publication Data

US 2002/0002225 A1 Jan. 3, 2002

Related U.S. Application Data

(63) Continuation-in-part of application No. 09/505,790, filed on Feb. 17, 2000, now abandoned.

(30) Foreign Application Priority Data

Feb. 18, 1999 (DE) .................................... 199 06 828

(51) Int. Cl.[7] .................. C08K 5/3432; C08K 5/08; B32B 31/14; C08L 67/00; C08L 69/00; C08L 77/00
(52) U.S. Cl. .................. 524/89; 524/358; 524/605; 524/606; 524/611; 156/272.8; 264/482
(58) Field of Search .................. 106/494; 156/272.8; 264/407, 482; 524/605, 89, 99, 358, 606, 611

(56) References Cited

U.S. PATENT DOCUMENTS

| | | | |
|---|---|---|---|
| 3,560,291 A | 2/1971 | Foglia et al. ............... 156/229 |
| 4,412,231 A | 10/1983 | Namba et al. ............ 346/135.1 |
| 4,636,609 A | 1/1987 | Nakamata ............... 219/121.64 |
| 4,978,007 A | 12/1990 | Jacobs et al. ................ 206/469 |
| 5,443,775 A | 8/1995 | Brannon ..................... 264/143 |
| 5,540,998 A | 7/1996 | Yamada et al. ........... 428/411.1 |
| 5,599,869 A | 2/1997 | Kurz ........................... 524/495 |
| 5,840,147 A | 11/1998 | Grimm .................... 156/272.2 |
| 5,893,959 A | 4/1999 | Muellich .................. 156/272.8 |
| 2002/0056707 A1 * | 5/2002 | Pinho et al. ........... 219/121.64 |
| 2003/0039837 A1 * | 2/2003 | Koshida et al. .......... 428/411.1 |

FOREIGN PATENT DOCUMENTS

| | | | |
|---|---|---|---|
| DE | 19960104 | * | 6/2001 |
| EP | 0 641 821 | | 8/1995 |
| EP | 1029650 | | 8/2000 |
| EP | 19906828 | | 8/2000 |
| WO | 95/26869 | | 10/1995 |

OTHER PUBLICATIONS

Potente, et al. "Entwicklungstendenzen beim Laserschweiβen von Kunststoffen", 4020 Plastverabeiter 46(1995) pp 58–64. XP 000556884.

Pütz et al., "Verbindung mit Zukunft", Plastverabeiter 48 Jahrgang 1997 Nr. 5, pps 28–30 (1997) XP 000691483.

European Search Report (EP 00 10 3247).

* cited by examiner

*Primary Examiner*—Callie Shosho
(74) *Attorney, Agent, or Firm*—Connolly Bove Lodge & Hutz, LLP

(57) ABSTRACT

A black thermoplastic molding composition which containing a dye combination made from nonabsorbing, non-black polymer-soluble dyes which produce a black thermoplastic molding composition which is translucent or transparent to laser light.

18 Claims, No Drawings

THERMOPLASTIC MOLDING COMPOSITION AND ITS USE FOR LASER WELDING

RELATED APPLICATIONS

This application is a continuation in part of German Application Number 199 06 828.3 filed Feb. 18, 1999 and a continuation in part of U.S. application Ser. No. 09/505,790 filed Feb. 17, 2000 now abandoned. Both of these applications are incorporated by reference in their entireties for all useful purposes.

FIELD OF INVENTION

The invention relates to a molding composition made from a thermoplastic with color dyes and its use for bonding thermoplastics with the aid of laser welding.

BACKGROUND OF THE INVENTION

Laser welding of thermoplastics has not yet become widely established in industry, since high capital expenditure deters potential users. However, H. Potente et al. in Plastverarbeiter No. 46 (1995), pp. 42–46, describes the enormous advantages of this process in various applications. In particular a considerable potential market is forecast for the jointing process in the future (see Plastverarbeiter No. 48 (1997) pp. 28–30).

In laser welding two plastics are normally combined with one another by bonding an upper plastic translucent to laser light with a lower plastic not translucent to laser light. The laser beam here passes through the upper layer of plastic leaving it unchanged and encounters the lower layer, by which it is absorbed with liberation of thermal energy. The thermal energy liberated melts the plastic material and thus bonds it to the upper layer at the point of impact of the laser beam.

A disadvantage of this method, however, is that it is not possible to process plastic compositions colored with absorbing dyes or pigments or comprising absorbing fillers, since the filler or dye or, respectively, the pigment used for coloration always immediately absorbs the laser light so that no bond is produced.

A particularly important example is that of polyester molding compositions pigmented black using carbon black. Generally, black molding compositions of thermoplastics are colored black with carbon black or other black pigments, but such molding compositions either absorb or reflect light, including laser light, in such an extent so that they cannot be used as the upper layer for laser welding. That means, shaped articles made from such composition cannot be combined with another layer of plastic by means of laser welding.

U.S. Pat. No. 5,540,998 discloses coating composition comprising which were colored black by a combination of colored, non-black pigments instead of black pigments. These compositions comprise constituents which result in curing of the coating, thus yielding a material which is no longer thermoplastic. The presence of pigments in general will cause laser light to be absorbed, reflected or dispersed. Therefore shaped articles colored black by a pigment combination as disclosed in U.S. Pat. No. 5,540,998 are unsuitable as the upper layer for laser welding as well. In general, the presence of mineralic fillers or other compounds that are finely dispersed within in the matrix will mostly cause laser light to be dispersed, absorbed or reflected as well, so the use of colorants and additives with thermoplastic molding compositions used for laser welding is restricted. It is desirable to have colored thermoplastic molding compositions available which are suitable as an upper, at least translucent layer for laser welding.

It is particularly desirable to have thermoplastic molding compositions available which are colored black and which are suitable for this purpose.

SUMMARY OF THE INVENTION

The object of the present invention was to provide a black thermoplastic molding composition which is translucent or transparent to laser light and which therefore is suitable for bonding by the laser welding method to other plastic parts comprising absorbing dyes, pigments or fillers.

This object has been achieved by a molding composition comprising a dye combination made from nonabsorbing, polymer-soluble dyes. Surprisingly, the molding composition comprises a combination of non-black, polymer-soluble dyes, which give the molding composition a black color.

It is surprising that this material can be used to bond black plastic parts to colored or black plastic parts.

DESCRIPTION OF THE PREFERRED EMBODIMENTS

The invention is directed to a black thermoplastic molding composition which comprises a dye combination made from nonabsorbing, non-black polymer-soluble dyes which produce a black thermoplastic molding composition which is translucent or transparent to laser light.

It is preferable that the molding composition comprises a combination of a yellow and a violet dye, or a combination of a red and a cyan dye, or a combination of a red, blue and yellow dye, or a combination of a red, yellow and green dye. It is particularly preferable for a molding composition comprising a yellow dye and a violet dye to be secured on black plastic parts. It is very particularly preferable for the thermoplastic molding composition to be used in which a shade of black has been brought about by the use of a yellow dye and a violet dye.

According to the invention, the dyes to be used are preferably dyes which belong to the chinophthalone or anthrachinone group of dyes. Particularly preferred are Sandoplast dyes. Sandoplast dyes of this type are generally high-quality polymer-soluble dyes which are suitable for coloring a variety of plastics. They are standardized in polystyrene, in which they give a brilliant and transparent coloration. Combinations with other organic or inorganic pigments give more intensely colored and more brilliant colorations. Sandoplast dyes can be used together with fluorescent Hostasol dyes to achieve especially brilliant hues.

The red dyes preferably used are Solvent Red 179 (Sandoplast Red 2G), Solvent Red 135 (Sandoplast Red G), Solvent Red 111 (Sandoplast Red PFS), Solvent Red 195 (Sandoplast Red BB) and the equivalent.

The blue dyes that are preferably used are Solvent Blue 104 (Sandoplast Blue 2B), Solvent Blue 122 (Polysynthren Blue R), Solvent Blue 45 (Polysynthren Blue RLS) and Solvent Blue 104 (Polysynthren Blue RBL) and the equivalent. The suitable blue dyes can be used to achieve cyan hues for the purposes of this invention.

The green dyes that are preferably used are Solvent Green 3 (Sandoplast Green GSB), Solvent Green 28 (Sandoplast Green G) and the equivalent.

Suitable yellow dyes are Solvent Yellow 93 (Sandoplast Yellow 3G), Solvent Yellow 114 (Sandoplast Yellow 2G), Solvent Yellow 98 and Solvent Yellow 133 (Polysynthren Yellow GG) and the equivalent.

Suitable violet dyes are Solvent Violet 13 (Sandoplast Violet RSB), Solvent Violet 37 (Sandoplast Violet FBL) and Solvent Violet 49 (Polysynthren Violet G) and the equivalent.

Cyan dyes include but are not limited to a naphthoquinone type dye, an anthraquinone dye and an azomethine dye such as those described in U.S. Pat. No. 5,614,289 which is incorporated for reference in its entirety for all usefull purposes.

In general, the dyes may be combined with the suitable thermoplastics in any way suitable for causing a black color of the thermoplastic.

Generally, the dyes are used in an amount of about 0.1 to about 10 g per kg of thermoplastic. Preferably the dyes are used in amounts of about 0.1 to about 2 g or about 2 to about 10 g per kg plastic. Particularly preferred the dyes may be used in an amount of about 0.5 to about 1.5 g per kg thermoplastic or about 3 to about 8 g per kg thermoplastic.

The most preferred yellow dye is Sandoplast Yellow, a dye deriving from the chinophthalone group of dyes. Sandoplast Yellow—2 G is indicated in the color index under "S.V. 114=Solvent Yellow 114".

The most preferred violet dye is Sandoplast Violet, a dye deriving from the anthrachinone group of dyes. Sandoplast Violet—RSB is indicated in the color index under "S.V. 13=Solvent Violet 13". These dyes have the following formulae:

Sandoplast Yellow (Solvent Yellow 114, Color Index 47020)

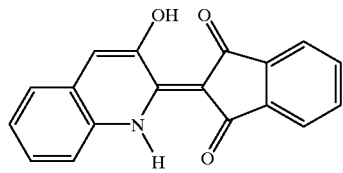

Sandoplast Violet (Solvent Violet 13, Color Index 60725)

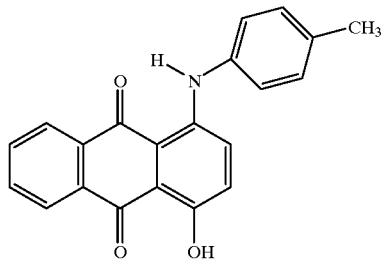

The amount of yellow dye suitable according to the invention is from about 0.1 to about 2 g, preferably from about 0.5 to about 1.5 g, per kg of plastic. The amount of violet dye suitable according to the invention is from about 2 to about 10 g, preferably from about 3 to about 8 g, per kg of plastic.

According to the invention the thermoplastics may be based on one or more of the following polymers: cycloolefin copolymers (COC), polystyrene, styrene-acrylonitrile-Copolymers, polycarbonate, polyacrylates, particularly polymethylmethacrylate, polyester, polyamide or a blend thereof. Preferably polyester, polycarbonate or polyamide are used as thermoplastic materials. Polyacetal, polyolefins like polypropylene or polyethylene or polyvinylchloride can be used in the same way, although they are less preferred because of their specific properties in respect to colorization. Unsuitable thermoplastics are copolymers or blends in which the different moieties undergo phase separation in such a way that the polymer matrix becomes inhomogenous, for example ABS.

The Polyester materials used comprise thermoplastic polyesters which contain polymerized units deriving from an ester of at least one aromatic dicarboxylic acid, in particular from terephthalic acid, isophthalic acid or 2,6-naphthalenedicarboxylic acid and from at least one aliphatic diol, in particular ethylene glycol 1,3-propanediol or 1,4-butanediol, or which contain polymerized units of tetrahydrofuran. Examples of suitable polyesters according to the invention are described in Ullmann's Encyclopedia of Ind. Chem., ed. Barbara Elvers, Vol. A24, Polyester section (pp. 227–251) VCH Weinheim-Basel-Cambridge-New-York (1992). Particular preference is given to polyesters such as polyethylene terephthalate or polybutylene terephthalate and to copolyesters containing butylene terephthalate units and butylene isophthalate units.

The polyesters may also have been modified by incorporating, during the condensation, small amounts of aliphatic dicarboxylic acids, such as, but not limited to glutaric acid, adipic acid or sebacic acid, or of polyglycols, such as, but not limited to diethylene glycol or triethylene glycol, or else higher-molecular-weight polyethylene glycols. The polyesters may also contain other polymerized units derived from hydroxycarboxylic acids, preferably from hydroxybenzoic acid or from hydroxynaphthalenecarboxylic acid.

Polycarbonates are known materials and are described, for example, in Saechtling, Kunststoff-Taschenbuch, 27$^{th}$ edition 1998, Hanser Verlag, on pages 479 to 485. Polycarbonates can for example be prepared by reaction of bisphenol A with phosgene, or melt condensation of diphenyl carbonate with bisphenol A. Possible comonomers used are also bisphenol TMC and bisphenol S (Dihydroxydiphenylsulfide). The flame retardance of these materials may be improved by using a halogenated bisphenol derivative, in particular a brominated bisphenol derivative.

Polycarbonates suitable usually have the general formula

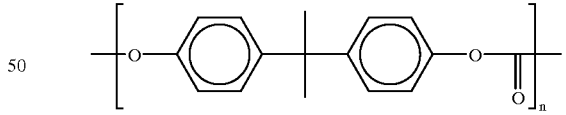

And may also comprise repeating units

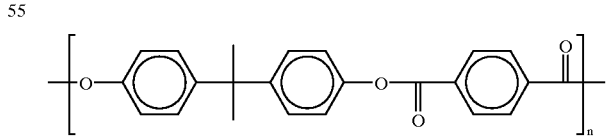

n is greater than one, preferably between 2 and 10.000. Most preferably, n is in such a range that the mean molecular weight of the polymer does not exceed 30.000 g/mole.

The materials may comprise bisphenol moieties which are substituted either on the aromatic ring, for example with bromine, or may carry different aliphatic rests on the carbon atom connecting the aromatic rings (bisphenol TMC comprising materials), or the aromatic rings may be connected with a heteroatom, for example sulfur (bisphenol S comprising materials).

The polyamides which are suitable according to the invention are described for example, in Saechtling, Kunststoff-Taschenbuch, 27$^{th}$ edition 1998, Hanser Verlag, on pages 465 to 478.

Polyamides usually have the general formula

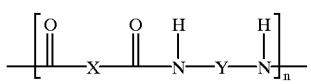

wherein X and Y are the same or different and may be an aromatic or aliphatic radical. The aromatic radical used are generally substituted in meta or para position. Aliphatic radicals are generally linear and not branched or cyclic, although such materials can be prepared and used. Preferably, the aliphatic radicals are linear, non-branched radicals having 4 to 13 carbon atoms. Particularly preferably are materials in which X is a linear, aliphatic radical having 4, 7, 8 or 10 carbon atoms and wherein Y is a linear, aliphatic radical having 4 or 6 carbon atoms. In a further preferred embodiment X is a phenyl rest which is substituted in para or meta position and Y is a linear, aliphatic radical having 6 carbon atoms, or in which Y is a 2,2,-dimethyl-4-methyl-hexyl rest, n is greater than one, preferably between 2 and 1000, particularly between 80 and 100.

Further preferred polyamides have the general formula

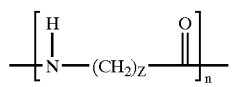

wherein Z is 5, 10 and 11 and n is greater than one, preferably between 2 and 1000, particularly between 80 and 100.

The properties of such materials as well as their preparation are generally known to a person skilled in the art.

The cycloolefin copolymers suitable for the purposes of the invention comprise at least one cycloolefin polymer selected from the class consisting of polymers containing from 0.1 to 100% by weight, preferably from 10 to 90% by weight, based on the total weight of the cycloolefin copolymer, of polymerized units of at least one cyclic olefin of the formulae I, II, II', III, IV, V or VI.

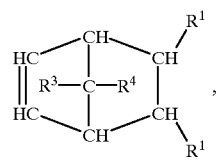

(I)

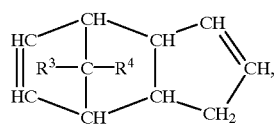

(II)

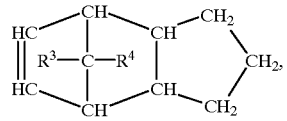

(II')

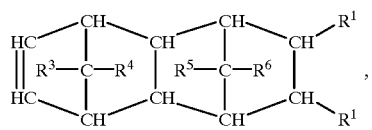

(III)

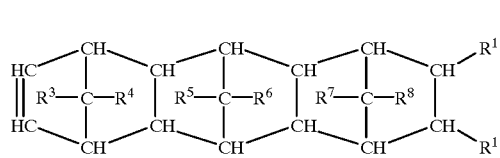

(IV)

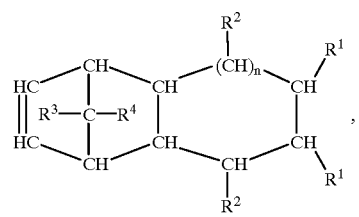

(V)

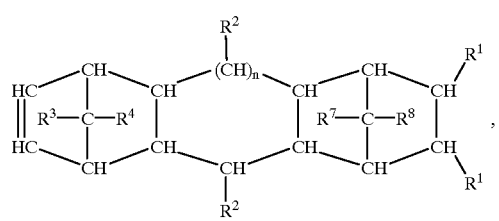

(VI)

wherein $R^1$, $R^2$, $R^3$, $R^4$, $R^5$, $R^6$, $R^7$ and $R^8$ are identical or different and are a hydrogen atom or a $C_1$–$C_{20}$-hydrocarbon radical, such as a linear or branched $C_1$–$C_8$-alkyl radical or $C_6$–$C_{18}$-aryl radical or $C_7$–$C_{20}$-alkylenearyl radical, or a cyclic or acyclic $C_2$–$C_{20}$-alkenyl radical, or form a saturated, unsaturated or aromatic ring, where the same radicals $R^1$ to $R^8$ in the different formulae I to VI may have different meanings, and n may be from 0 to 5, and from 0 to 99.9 mol %, based on the total composition of the cycloolefin copolymer, of polymerized units which derive from one or more acyclic olefins of the formula VII

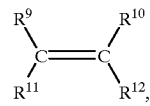

(VII)

wherein $R^9$, $R^{10}$, $R^{11}$ and $R^{12}$ are identical or different and are a hydrogen atom, a linear or branched, saturated or unsaturated $C_1$–$C_{20}$-hydrocarbon radical, such as a $C_1$–$C_8$-alkyl radical, or a $C_6$–$C_{18}$-aryl radical.

The cycloolefin copolymers may also be obtained by ring-opening polymerization of at least one of the monomers with the formulae I to VI, followed by hydrogenation of the products obtained.

The cycloolefin copolymer may also contain from 0 to 45 mol %, based on the total composition of the cycloolefin copolymer, of polymerized units which derive from one or more monocyclic olefins of the formula VIII

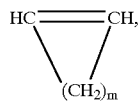

(VIII)

wherein m is a number from 2 to 10.

The proportion of the polymerized units which derive from cyclic, in particular polycyclic, olefins is preferably from 3 to 75 mol %, based on the total composition of the cycloolefin copolymer. The proportion of the polymerized units which derive from acyclic olefins is preferably from 5 to 80 mol %, based on the total composition of the cycloolefin copolymer.

Besides freshly prepared thermoplastics, the thermoplastics may also comprise first-, second- or higher-generation recycled materials, or mixtures of freshly prepared thermoplastics with recycled materials. Mixtures of this type may also, if desired, comprise additives, or may have been modified by admixing other compatible polymers, as long as the transparency or translucency to laser light is not or only marginally affected by the additives.

The thermoplastics may, according to the invention, also comprise additives, fillers and processing aids, as long as these additives do not or only marginally affect the transparency or translucency to laser light. This means that the additives suitable generally are restricted to polymer soluble additives. Particularly carbon black or mineralic fillers, such as titanium dioxide, zinc sulfide, graphite, talc or mica, are unsuitable because they will cause absorption and/or reflection of the laser light. Such fillers and additives may be added in very small amount so they no longer affect the laser light, but the desired effects of these additives usually cannot be observed at such low concentrations. Carbon fibers and particularly glass fibers can be advantagesouly used as reinforcing agents, also the amount employed is restricted. Glass fibers can be used in amount of up to 30% by weight, based on the total amount of thermoplastic. Due to the dispersion of laser light in materials comprising glass or carbon fibers, the thickness of such materials to be laser welded onto another substrate is limited. In the example of glass fibers being used in an amount of 30% by weight, layers of up to 2 mm, preferably up to 1 mm, may be laser welded to another substrate. Polymer soluble additives, such as lubricants, antioxidants, UV stabilizers may be used without limitation.

Surprisingly, it has been found that the molding compositions with the dye combinations according to the invention, although they look black to the naked eye, are completely translucent or transparent to laser light and therefore are highly suitable for producing the upper translucent layer for the laser welding process.

The working example below is intended to give the skilled worker a more detailed description of the invention and the advantages achievable therewith.

COMPARATIVE EXAMPLE 1

Two black films made from polybutylene terephthalate with an added amount of 6.5 g of carbon black per kg of plastic were produced by extrusion and had in each case a thickness of 40 μm. The two films were laid one on top of the other and irradiated with a laser beam from a NdYAG laser for a period of 3 s.

After the irradiation the surface of the upper film had melted, but there had been no bonding of the two films.

EXAMPLE 1

Comparative Example 1 was repeated except that the upper film used a polybutylene terephthalate with a dye combination of black appearance, made from 0.9 g of Sandoplast Yellow and 5.1 g Sandoplast Violet per kg of plastic.

After the same period of irradiation as in Comparative Example 1, using an identical laser beam, a firmly adhering bond had developed between the two films.

All the references listed in this application are incorporated by reference in their entireties for all usefull purposes.

I claim:

1. A black thermoplastic molding composition which comprises a dye combination made from nonabsorbing polymer-soluble yellow dye and nonabsorbing polymer-soluble violet dye B1 is translucent or transparent to laser light.

2. The composition as claimed in claim 1, wherein said yellow dye is chinophthalone and said violet dye is anthrachinone group.

3. The composition as claimed in claim 2, wherein the thermoplastic is a polyester, polycarbonate or a polyamide.

4. The composition as claimed in claim 1, wherein the yellow dye is Solvent Yellow 93, Solvent Yellow 114, Solvent Yellow 98, Solvent Yellow 133 or a mixture thereof.

5. The composition as claimed in claim 4, wherein the violet dye is Solvent Violet 13, Solvent Violet 37, Solvent Violet 49 or mixtures thereof.

6. The composition as claimed in claim 1, wherein the violet dye is Solvent Violet 13, Solvent Violet 37, Solvent Violet 49 or a mixture thereof.

7. The composition as claimed in claim 1, wherein the thermoplastic is a polyester, polycarbonate or a polyamide.

8. The composition as claimed in claim 1, wherein the yellow dye is used in an amount from about 0.1 to about 2 g, per kg of thermoplastic.

9. The composition as claimed in claim 1, wherein the yellow dye is used in an amount from about 0.5 to about 1.5 g, per kg of thermoplastic.

10. The composition as claimed in claim 9, wherein the violet dye is used in an amount from about 3 to about 8 g, per kg of thermoplastic.

11. The composition as claimed in claim 10, wherein the thermoplastic is a polyester, polycarbonate or a polyamide.

12. The composition as claimed in claim 10, wherein said violet dye is Solvent Violet 13 and said yellow dye is Solvent Yellow 114.

13. The composition as claimed in claim 1, wherein the violet dye is used in an amount from about 2 to about 10 g, per kg of thermoplastic.

14. The composition as claimed in claim 1, wherein said violet dye is Solvent Violet 13 and said yellow dye is Solvent Yellow 114.

15. The composition as claimed in claim 1, which further comprise at least one of the following additional materials selected from the group consisting of additives, fillers and processing aids.

16. A method of bonding two thermoplastic materials together which comprises laser welding the thermoplastic molding composition as claimed in claim 1 to a different thermoplastic material.

17. The method as claimed in claim 16, wherein said different thermoplastic material is a material colored with absorbing dyes, pigments or absorbing fillers.

18. A black thermoplastic molding composition which comprises a dye combination made from nonabsorbing, non-black polymer-soluble dyes which produce a black thermoplastic molding composition which is translucent or transparent to laser light, wherein said thermoplastic is based on one or more of the following polymers: cycloolefin copolymers (COC), polystyrene, styrene-acrylonitrile-copolymer, polycarbonate, polyacrylate, polyester, polyamide or a blend thereof.

* * * * *

UNITED STATES PATENT AND TRADEMARK OFFICE
CERTIFICATE OF CORRECTION

PATENT NO.    : 6,759,458 B2
DATED         : July 6, 2004
INVENTOR(S)   : Frank Reil It is certified that error appears in the above-identified patent and that said Letters Patent is hereby corrected as shown below:

<u>Title page,</u>
Item [*] Notice, "bydays.days." should read -- by 136 days. --.

<u>Column 8,</u>
Line 19, delete "B1" and insert -- wherein said black thermoplastic molding composition --.

Signed and Sealed this

Thirtieth Day of November, 2004

JON W. DUDAS
*Director of the United States Patent and Trademark Office*